(12) United States Patent
Marti et al.

(10) Patent No.: US 11,385,603 B2
(45) Date of Patent: Jul. 12, 2022

(54) MODIFICATION OF AUTOMATED ENVIRONMENT BEHAVIOR BASED ON USER ROUTINE

(71) Applicant: Apple Inc., Cupertino, CA (US)

(72) Inventors: Lukas M. Marti, San Jose, CA (US); Robert W. Mayor, Half Moon Bay, CA (US); Arun G. Mathias, Los Gatos, CA (US); Ronald Keryuan Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/594,473

(22) Filed: Oct. 7, 2019

(65) Prior Publication Data

US 2020/0117149 A1    Apr. 16, 2020

Related U.S. Application Data

(63) Continuation of application No. 14/856,228, filed on Sep. 16, 2015, now Pat. No. 10,496,050.

(Continued)

(51) Int. Cl.
| | |
|---|---|
| *G05B 13/02* | (2006.01) |
| *H04L 12/28* | (2006.01) |
| *H04L 29/08* | (2006.01) |
| *G05B 15/02* | (2006.01) |
| *H04L 67/50* | (2022.01) |

(52) U.S. Cl.
CPC ......... *G05B 13/0265* (2013.01); *G05B 15/02* (2013.01); *H04L 12/282* (2013.01); *H04L 12/2816* (2013.01); *H04L 67/22* (2013.01); *G05B 2219/2642* (2013.01)

(58) Field of Classification Search
CPC ............... G05B 13/0265; G05B 15/02; G05B 2219/2642; H04L 12/2816; H04L 12/282; H04L 67/22; G06F 9/542
See application file for complete search history.

(56) References Cited

U.S. PATENT DOCUMENTS

| | | |
|---|---|---|
| 8,214,061 B2 | 7/2012 | Westrick, Jr. et al. |
| 8,255,090 B2 | 8/2012 | Frader-Thompson et al. |

(Continued)

FOREIGN PATENT DOCUMENTS

| | | |
|---|---|---|
| CN | 101197744 | 6/2008 |
| CN | 101459725 | 6/2009 |

(Continued)

OTHER PUBLICATIONS

US 10,437,202 B2, 10/2019, Marti et al. (withdrawn)

(Continued)

*Primary Examiner* — Charles R Kasenge
(74) *Attorney, Agent, or Firm* — Kilpatrick Townsend & Stockton LLP

(57) ABSTRACT

An automated environment can include an accessory device that operates according to an automation rule, to take a prescribed action when a triggering condition occurs. A controller device for the automated environment can determine a user's regular routine and can detect when the user is deviating from the regular routine. The controller device can communicate with accessory devices in the automated environment to modify their behavior relative to the automation rules.

22 Claims, 7 Drawing Sheets

Related U.S. Application Data

(60) Provisional application No. 62/057,727, filed on Sep. 30, 2014.

(56) References Cited

U.S. PATENT DOCUMENTS

| | | |
|---|---|---|
| 8,630,741 B1 | 1/2014 | Matsuoka et al. |
| 8,909,950 B1 | 12/2014 | Levchuk et al. |
| 8,989,910 B1 | 3/2015 | Klots |
| 8,996,188 B2 | 3/2015 | Frader-Thompson et al. |
| 9,274,512 B1 | 3/2016 | Zima |
| 9,351,381 B2 | 5/2016 | Verfuerth et al. |
| 9,432,210 B2 | 8/2016 | Bhargava et al. |
| 9,482,442 B1 | 11/2016 | Mengle et al. |
| 10,416,205 B2 | 9/2019 | Marti et al. |
| 10,416,625 B2 | 9/2019 | Marti et al. |
| 2007/0273307 A1 | 11/2007 | Westrick, Jr. et al. |
| 2008/0036591 A1 | 2/2008 | Ray |
| 2008/0177678 A1 | 7/2008 | Di Martini et al. |
| 2009/0195349 A1 | 8/2009 | Frader-thompson et al. |
| 2010/0082169 A1 | 4/2010 | Crist et al. |
| 2010/0156665 A1 | 6/2010 | Krzyzanowski et al. |
| 2010/0286937 A1 | 11/2010 | Hedley |
| 2011/0185203 A1 | 7/2011 | Carlson et al. |
| 2011/0290893 A1 | 12/2011 | Steinberg |
| 2012/0054125 A1 | 3/2012 | Clifton et al. |
| 2012/0086562 A1 | 4/2012 | Steinberg |
| 2012/0131504 A1 | 5/2012 | Fadell et al. |
| 2012/0191257 A1 | 7/2012 | Corcoran et al. |
| 2012/0215369 A1 | 8/2012 | Desai et al. |
| 2012/0286723 A1 | 11/2012 | Ukita et al. |
| 2012/0316808 A1 | 12/2012 | Frader-Thompson et al. |
| 2013/0144445 A1 | 6/2013 | Steinberg |
| 2013/0218360 A1 | 8/2013 | Najewicz et al. |
| 2013/0262197 A1 | 10/2013 | Kaulgud et al. |
| 2014/0039690 A1 | 2/2014 | Steinberg |
| 2014/0067130 A1* | 3/2014 | Pillai ............... H05B 47/10 700/275 |
| 2014/0070959 A1 | 3/2014 | Bhargava et al. |
| 2014/0074257 A1 | 3/2014 | Bhargava et al. |
| 2014/0084165 A1 | 3/2014 | Fadell et al. |
| 2014/0118148 A1 | 5/2014 | Edlund et al. |
| 2014/0136242 A1 | 5/2014 | Weekes et al. |
| 2014/0156028 A1 | 6/2014 | Subramaniam et al. |
| 2014/0181521 A1 | 6/2014 | Hemphill et al. |
| 2014/0191575 A1 | 7/2014 | Gaucher et al. |
| 2014/0201315 A1 | 7/2014 | Jacob et al. |
| 2014/0222954 A1 | 8/2014 | Vaccari et al. |
| 2014/0229018 A1 | 8/2014 | Steinberg |
| 2014/0266669 A1 | 9/2014 | Fadell et al. |
| 2014/0278051 A1 | 9/2014 | Mcgavran |
| 2014/0316581 A1* | 10/2014 | Fadell ............... F24F 11/30 700/276 |
| 2015/0025698 A1 | 1/2015 | Strelec |
| 2015/0074228 A1 | 3/2015 | Drake |
| 2015/0081118 A1 | 3/2015 | Endrizzi et al. |
| 2015/0168001 A1 | 6/2015 | Steinberg |
| 2015/0168002 A1* | 6/2015 | Plitkins ............... F24F 11/70 165/237 |
| 2015/0168003 A1* | 6/2015 | Stefanski ............... F24F 11/70 165/237 |
| 2015/0222517 A1 | 8/2015 | Mclaughlin et al. |
| 2015/0223416 A1 | 8/2015 | Eng et al. |
| 2015/0262132 A1 | 9/2015 | Miller et al. |
| 2015/0308084 A1 | 10/2015 | Thompson et al. |
| 2015/0308706 A1* | 10/2015 | Bunker ............... G05B 15/02 700/275 |
| 2015/0323915 A1* | 11/2015 | Warren ............... H04L 12/2803 700/275 |
| 2015/0330652 A1* | 11/2015 | Kim ............... F24F 11/62 700/276 |
| 2015/0350031 A1 | 12/2015 | Burks |
| 2015/0351145 A1 | 12/2015 | Burks |
| 2016/0091540 A1 | 3/2016 | Marti et al. |
| 2016/0091871 A1 | 3/2016 | Marti et al. |
| 2016/0091879 A1 | 3/2016 | Marti et al. |
| 2016/0132030 A1 | 5/2016 | Marti et al. |
| 2016/0161310 A1 | 6/2016 | Leaders et al. |
| 2016/0224033 A1 | 8/2016 | Gingrich |
| 2017/0070842 A1* | 3/2017 | Kulp ............... H04W 4/50 |
| 2017/0222894 A1 | 8/2017 | Park et al. |
| 2018/0246480 A1* | 8/2018 | Bunker ............... G05B 15/02 |

FOREIGN PATENT DOCUMENTS

| | | |
|---|---|---|
| CN | 201548850 | 8/2010 |
| CN | 102736599 | 10/2012 |
| CN | 102984039 | 3/2013 |
| EP | 2741448 | 6/2014 |
| WO | 2013184108 | 12/2013 |

OTHER PUBLICATIONS

U.S. Appl. No. 14/856,228, "Advisory Action", dated Apr. 26, 2018, 5 pages.

U.S. Appl. No. 14/856,228, "Final Office Action", dated Jan. 26, 2018, 11 pages.

U.S. Appl. No. 14/856,228, "Final Office Action", dated Feb. 13, 2019, 13 pages.

U.S. Appl. No. 14/856,228, "First Action Interview Pilot Program Pre-Interview Communication", dated Aug. 11, 2017, 4 pages.

U.S. Appl. No. 14/856,228, "Non Final Office Action", dated Aug. 7, 2018, 11 pages.

U.S. Appl. No. 14/856,228, "Non-Final Office Action", dated Jul. 24, 2017, 10 pages.

U.S. Appl. No. 14/856,228, "Notice of Allowance", dated Jun. 5, 2019, 11 pages.

Chen et al., "Energy Outlier Detection in Smart Environments", Artificial Intelligence and Smarter Living—The Conquest of Complexity, Papers from the 2011 AAAI Workshop (WS-11-07), 2011, 6 pages.

Chen et al., "Mining Correlation Patterns among Appliances in Smart Home Environment", PAKDD, Part II, LNAI, 8444, 2014, pp. 222-233.

Chen et al., "Significant Correlation Pattern Mining in Smart Homes", Association for Computing Machinery, May 20, 2015, 20 pages.

Fatima et al., "A Unified Framework for Activity Recognition-Based Behavior Analysis and Action Prediction in Smart Homes", Sensors, vol. 13, 2013, pp. 2682-2699.

Iglesias et al., "A Global Approach of Habit Profiles for Smart Home Control", Proceedings of BS2013, 13th Conference of International Building Performance Simulation Association, Chambery, France, Aug. 26, 2013, 8 pages.

Jakkula et al., "Temporal Pattern Discovery for Anomaly Detection in a Smart Home", Proceedings of the 3rd IET Conference on Intelligent Environments, 2007, pp. 339-345.

Mozer et al., "Chapter 12 Lessons from an Adaptive Home", Smart Environments: Technologies, Protocols, and Applications, Jan. 28, 2005, 15 pages.

PCT/US2015/050433, "International Search Report and Written Opinion", dated Nov. 25, 2015, 10 pages.

Schweizer et al., "Learning Frequent and Periodic Usage Patterns in Smart Homes", Master Thesis, University of Applied Sciences and Arts Northwestern Switzerland School of Business, Jan. 31, 2014, 133 pages.

Weiss et al., "Leveraging smart meter data to recognize home appliances", 2012, 8 pages.

Chinese Patent Application No. 201580046349.1, "Office Action", dated Mar. 10, 2020, 5 pages.

* cited by examiner

MODIFICATION OF AUTOMATED ENVIRONMENT BEHAVIOR BASED ON USER ROUTINE

CROSS-REFERENCES TO RELATED APPLICATIONS

This application in a continuation of U.S. patent application Ser. No. 14/856,228 filed on Sep. 16, 2015, which claims the benefit of U.S. Provisional Application No. 62/057,727 filed on Sep. 30, 2014, the disclosures of which are hereby incorporated by reference in their entirety for all purposes.

The present disclosure is also related to the following commonly-owned applications: U.S. patent application Ser. No. 14/614,914, filed Feb. 5, 2015 (Published as 2015/0222517); U.S. patent application Ser. No. 14/725,891, filed May 29, 2015; U.S. patent application Ser. No. 14/725,912, filed May 29, 2015; and U.S. patent application Ser. No. 14/081,895, filed Nov. 15, 2013 (published as 2014/0278051), the disclosures of which are incorporated by reference in their entirety.

BACKGROUND

The present disclosure relates in general to an accessory management system and in particular to modification of automated environment behavior based on a user routine.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc. It is sometimes desirable to automate operation of such devices.

SUMMARY

An automated environment can allow users' mobile devices (and/or other "controllers") to control various other devices (referred to as "accessories") in the automated environment. The user can interact with an accessory by operating a controller that can communicate message to the accessory in response to user input. In some instances, accessory operation can be automated. For example, a controller can be programmed to automatically instruct an accessory to initiate a specific action when certain triggering conditions are met, such as turning on a heating system or changing a thermostat's target temperature at a particular time, or turning on a light if the controller detects an ambient light level below a threshold. One or more controller devices can also act as a "coordinator" to manage communications between multiple controllers and multiple accessories. However, automating behavior of accessories in an environment can be complicated by various factors, including the fact that users might not always adhere to a consistent schedule.

Accordingly, certain embodiments of the present invention provide automated environments that interact with a controller device capable of determining a user's established routine and detecting when the user deviates from the established routine. The controller device can communicate with a coordinator device of the automated environment and/or with specific accessories in the automated environment to modify their behavior accordingly. For example, if the user is not coming home at the usual time, a thermostat accessory can delay heating or cooling of the house, thereby saving energy.

The following detailed description together with the accompanying drawings will provide a better understanding of the nature and advantages of the present invention.

DETAILED DESCRIPTION

Certain embodiments of the present invention provide automated environments that interact with a controller device capable of determining a user's established routine and detecting when the user deviates from the established routine. The controller device can communicate with a coordinator device of the automated environment and/or with specific accessories in the automated environment to modify their behavior accordingly. For example, if the user is not coming home at the usual time, a thermostat accessory can delay heating or cooling of the house, thereby saving energy.

To provide context for understanding the present invention, example implementations of an automated environment and a system that can determine a user's established routine will be described. Thereafter, specific examples of modifying an operational behavior in an automated environment based on a user routine will be described.

I. Example Environment

Figure 1:
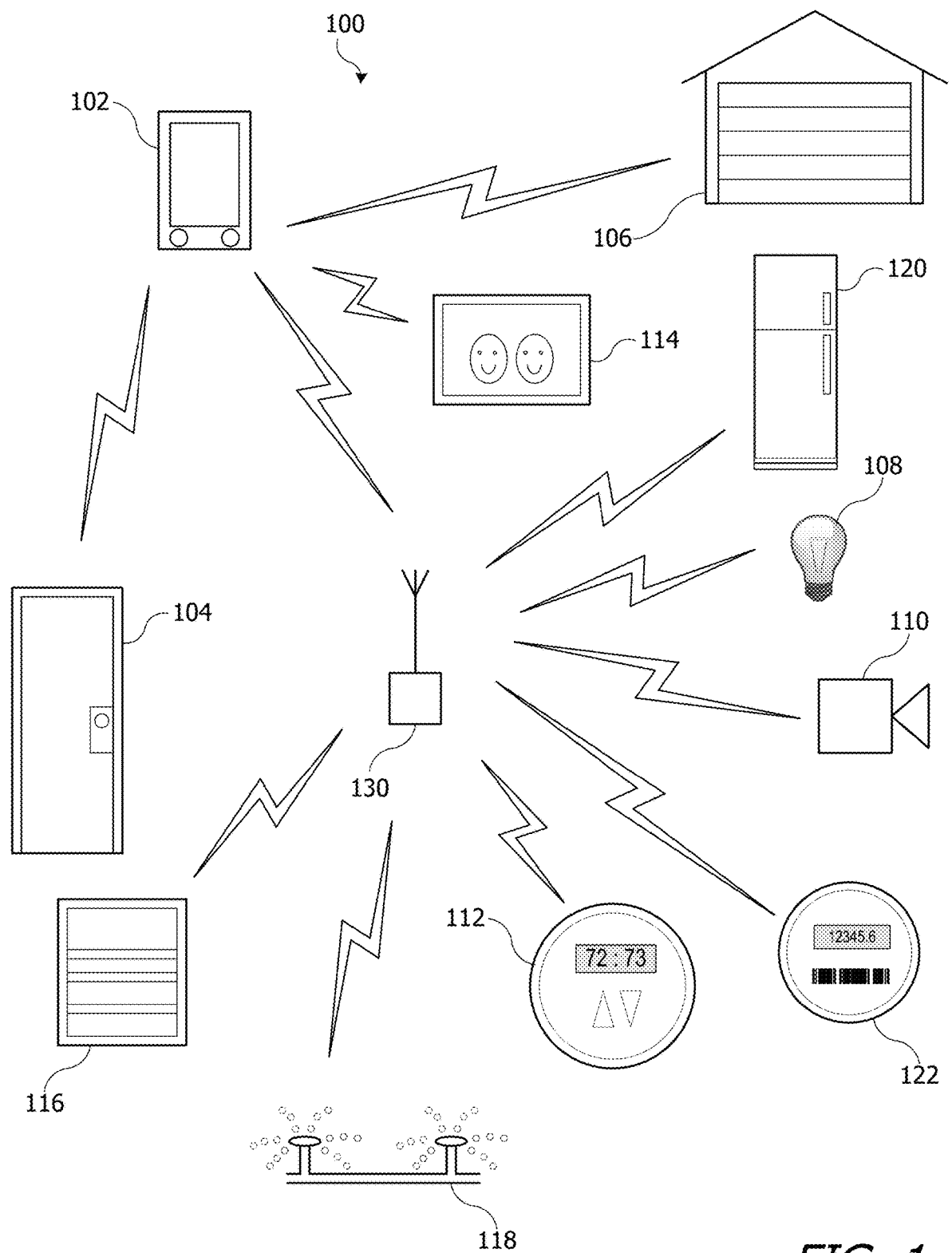
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. patent application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) can provide a user interface and communicate with the base station to effect control over accessories. In some embodiments, the base station can function as a coordinator or proxy for the accessories, e.g., as described below.

As used herein, an "accessory" can be any device or thing located in an environment that is controllable (at least to some degree) by a controller such as controller 102. Examples of accessory devices in a home environment can include door lock 104, garage door system 106, light fixture 108, security camera 110, thermostat 112, TV 114, window 116, sprinkler system 118, household appliance (e.g., refrigerator) 120, and utility meter (e.g., electric meter) 122. In some instances, controller 102 can communicate directly with an accessory; for instance, controller 102 is shown communicating directly with door lock 104, garage door system 106, and TV 114. In other instances, controller 102 can communicate via an intermediary. For instance, controller 102 is shown communicating via a wireless network access point 130 with accessories 108, 110, 112, 116, 118, 120, 122 that are on a wireless network provided by access point 130. As noted above, in some embodiments, controller 102 can include a base station, and base station functionality can be integrated into access point 130 or into one of the accessories that is to be controlled (e.g., thermostat 112). In some embodiments, a base station can function as a proxy or coordinator as described below.

Various communication transports and combinations of transports can be used, and different transports can be used with different devices. For example, some wireless transports such as Bluetooth® transports (e.g., Bluetooth Classic, Bluetooth LE, and other transports conforming to standards promulgated by Bluetooth SIG, Inc., headquartered in Kirkland, Wash.) can support direct point-to-point communication between devices within a limited range. Other wireless transports such as Wi-Fi® transports (conforming to standards promulgated by Wi-Fi Alliance, headquartered in Austin, Tex.) can define a wireless network with a central access point that routes communications between different devices on the network. Further, while wireless communication transports are shown, wired transports can also be provided for some or all of the accessories. For example, light fixture 108 can be connected to access point 130 by a wired connection, and controller 102 can communicate with light fixture 108 by sending messages wirelessly to access point 130, which can deliver the messages to light fixture 108 via the wired connection. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-122. Different controller devices can be configured to communicate with different subsets of the accessories; for example, a child's controller might be blocked from modifying settings on thermostat 112, while a parent's controller device is permitted to modify the settings. Such permissions can be configured and controlled, for example, as described in above-referenced U.S. patent application Ser. Nos. 14/725,891 and 14/725,912

In some embodiments, a universal accessory protocol can facilitate communication by a controller 102 with one or more accessories 104-122. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. Examples of an accessory model based on services and characteristics are described in above-referenced U.S. patent application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages, and the message format can be the same across different accessories. Examples of message formats are described in above-referenced U.S. patent application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. patent application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other (e.g., in a secure storage element), so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a secure session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. patent application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be "universal," meaning that they can be applied in any context with one or more controllers and one or more accessories regardless of accessory function or controller form factor or specific interfaces.

II. Example Accessory and Controller Network

For purposes of implementing an automated environment, it is desirable to allow accessories to be controlled by multiple controllers and to allow one controller to control multiple accessories. Accordingly, accessories and/or controllers can be connected into accessory networks and controller networks. This can be done, for instance, by establishing pairings between various accessories and various controllers and providing a security protocol such that an accessory only responds to a controller if a pairing has been established. Examples of establishing pairings and associated security protocols are described in U.S. patent application Ser. Nos. 14/614,914; 14/725,891; and Ser. No. 14/725,912.

Figure 2:
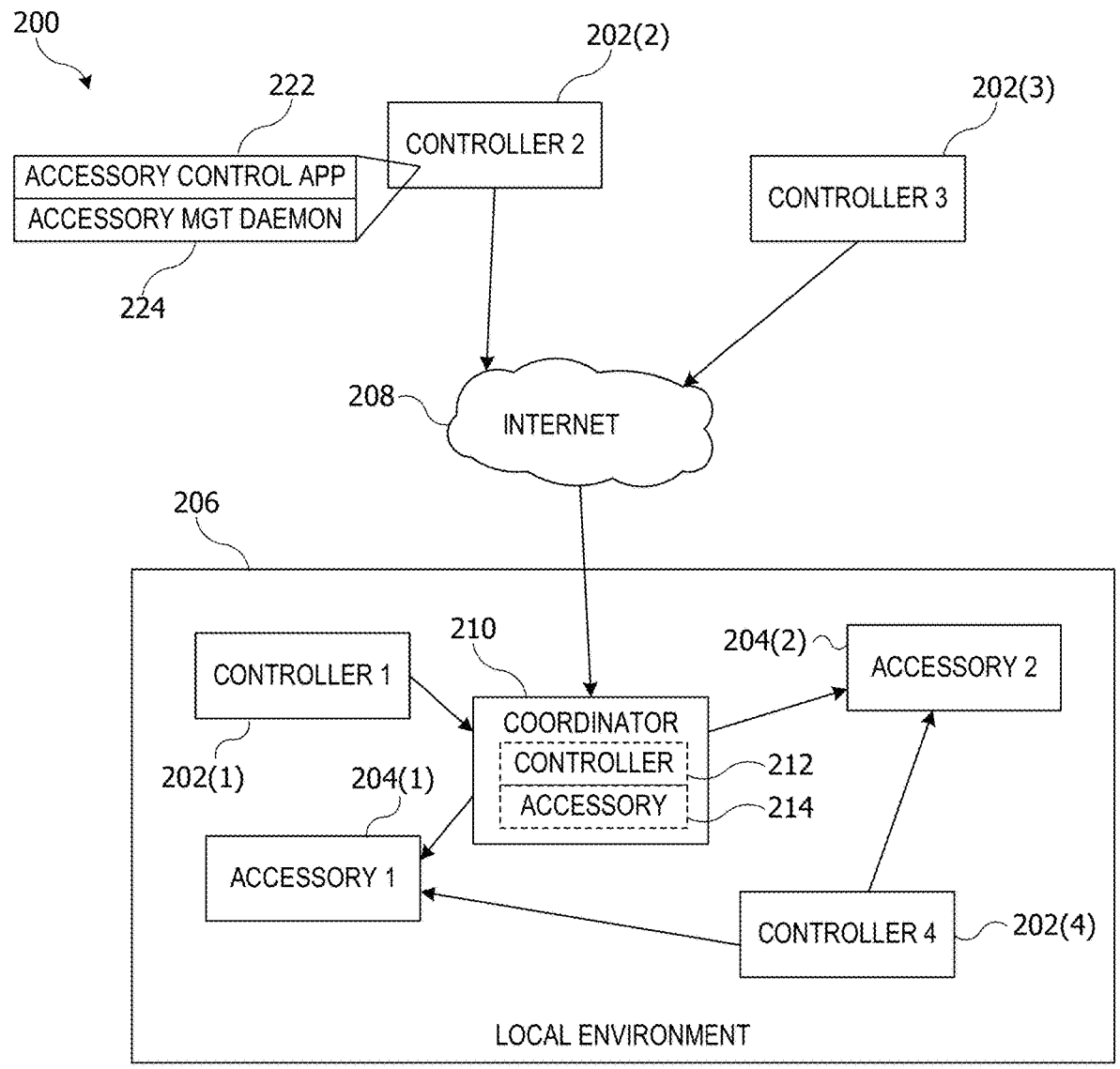
FIG. 2 shows an example of a network configuration according to an embodiment of the present invention.

In some embodiments, an automated environment can include a "coordinator" device that can act as an intermediary or proxy between controllers and accessories. FIG. 2 shows an example of a network configuration 200 according to an embodiment of the present invention that allows multiple controllers 202 to interact with multiple accessories 204 in a local environment 206. While two accessories and four controllers are shown, it is to be understood that any number of controllers and/or accessories can be included.

Controllers 202(1)-202(4) can each be similar to controller 102 of FIG. 1. For example, each controller 202 can be a mobile device (e.g., a mobile phone or wearable device). Accessories 204(1) and 204(2) can be similar to any of accessories 104-122 of FIG. 1 and can be any devices located in a "local environment" 206 (e.g., a home environment). For purposes of description, it is assumed that accessories 204 remain in local environment 206, while controllers 202, being mobile devices, can be sometimes within and sometimes outside local environment 206.

In this example, controllers 202(1) and 202(4) are currently located in local environment 206 with accessories 204(1) and 204(2). For example, controllers 202(1), 202(4), and accessories 204(1), 204(2) can be on the same local area network (LAN), such as a Wi-Fi network or within Bluetooth communication range or the like. Controllers 202(2) and 202(3) are currently located outside local environment 206 but are connected to a wide-area communication network 208 (e.g., the Internet); such controllers are said to be "remote" from accessories 204. In this example, it is assumed that accessories 204 can communicate only within local environment 206 and are not directly connected to wide-area communication network 208. Thus, communication between controller 202(2) or 202(3) with accessories 204 would proceed through an indirect path.

A "coordinator" 210 can be a device that facilitates communication between remote controllers 202(2), 202(3) and accessories 304(1) and 304(2). Coordinator 210 can be any electronic device that is present in local environment 206 and capable of communicating with accessories 204. For example, coordinator 210 can be a mobile device that happens to be in local environment 206. As another example, coordinator 210 can be a device that is expected to stay in local environment 206 and that is expected to be powered on and available for communication most or all of the time. (It is to be understood that coordinator 210 can occasionally be unavailable, e.g., in connection with software or firmware upgrades, power outages, or other intermittent occurrences.) For example, coordinator 210 can be implemented in a desktop computer, a network access-point unit, a dedicated accessory-control base station, a set-top box for a television or other appliance (which can implement coordinator and/or other base station functionality in addition to interacting with the television or other appliance), or any other electronic device as desired.

In some embodiments, coordinator 210 can act as a relay or proxy between controllers 202 and accessories 204. Thus, for example, coordinator 210 can present itself to controllers 202 as a virtual accessory 214 and to accessories 204 as a virtual controller 212. In operation, a controller, e.g., controller 202(2), can establish a secure communication session with coordinator 210 and send a message to coordinator 210 indicating that it wishes to communicate with an accessory in local environment 206, e.g., accessory 204(1). Coordinator 210 can establish a secure communication session with accessory 204(1) and use that session to relay messages between controller 202(2) and accessory 204(1). For example, through the relay, controller 202(2) can establish its own secure session with accessory 204(1), then send control messages and receive responses within the secure session. In some embodiments, coordinator 210 can pass the messages back and forth (optionally adding its own authenticated signature or encryption layer) while remaining agnostic to their content. Examples of such operations are described in above-referenced U.S. patent application Ser. Nos. 14/725,891 and 14/725,912.

In some embodiments, controllers 202 can prefer to communicate with accessories 204 via coordinator 210 whenever coordinator 210 is available. Thus, for example, controller 202(1), which is in local environment 206, can communicate with coordinator 210 rather than directly with accessories 204. Remotely located controllers 202(2) and 202(3) do not have direct communication with accessories 204 and also communicate via coordinator 210. Alternatively, controllers 202 can communicate directly with accessories 204 when in local environment 206, e.g., as shown for controller 202(4). Any combination of direct and/or indirect communication with accessories can be supported.

Where a controller-coordinator pairing and one or more coordinator-accessory pairings are established, coordinator 210 can present itself to controllers 202 as an "accessory network" via which controller 202 can access all the services of all accessories 204 with which coordinator 210 has an established pairing. For instance, coordinator 210 can present an accessory network modeled as a "home" or other environment. The model can define various physical and/or logical groupings of accessories that can be controlled in a coordinated manner. Controllers 202 can operate any accessory in the network by interacting with coordinator 210. In some instances, operation of particular accessories by particular controllers can be restricted using a system of permissions.

In some embodiments, coordinator 210 can operate as an intelligent agent for allowing controllers 202 to operate accessories 204, rather than simply relaying messages as described above. For example, when controller 202(1) receives a user request to interact with accessory 204(1), controller 202(1) can provide instructions for accessory 204(1) to coordinator 210. Coordinator 210 can receive the instructions, establish a communication session with accessory 204(1) and send appropriate control messages to accessory 204(1). In some embodiments, the messages sent to accessory 204(1) need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204(1) to coordinator 210. Coordinator 210 can analyze the received instructions, e.g., to detect and resolve conflicts such as where controller 202(1) instructs coordinator 210 to turn accessory 204(1) on while controller 202(2) instructs coordinator 210 to turn accessory 204(1) off. Coordinator 210 can be programmed with priority rules or other rules for resolving conflicts (e.g., "on" takes priority over "off"; instructions from controller 202(1) take priority over instructions from controller 202(2); etc.). Coordinator 210 can apply the priority rule to resolve any conflicts and can communicate instructions to accessory 204(1) based on the resolution. When a response is received from accessory 204(1), coordinator 210 can determine whether to send a corresponding message (or a different message) to controller 202(1) and/or to controller 202(2). Thus, coordinator 210 is not limited to acting as a passive relay for messages between controllers and accessories but can actively intervene to resolve conflicting instructions, enforce any limitations that may exist on the privileges or permissions granted to particular controllers or users, and so on. Further examples of operation of a coordinator such as coordinator 210 are described in above-referenced U.S. patent application Ser. Nos. 14/725,891 and 14/725,912.

From a user's perspective, operation of controller 202(2) to control accessories 204 can be the same regardless of whether the connection to accessories 204 is direct or through coordinator 210. For example, as shown for controller 202(2), any of controllers 202 can execute an accessory-control application 222 that generates a user interface (such as a graphical user interface) for controlling any of accessories 204, e.g., accessory 204(1). The interface can include display elements to display current settings of accessory 204, user-operable controls to change some or all of the settings, etc. Accessory-control application 222 can interact with an operating-system process 224 (referred to herein as an "accessory management daemon") that manages the communication between controller 202(2) and accessory 204(1). Accessory management daemon 224 can present an application program interface (API) to application 222 in a manner that is transport-agnostic, so that application 222 can, for instance, invoke an API function indicating that a message should be sent to accessory 204(1). Accessory management daemon 224 can, transparently to the user, create either a direct or indirect (e.g., through coordinator 210) communication path to accessory 204(1) and send the message. In some embodiments, accessory management daemon 224 can also handle operations such as pair verify and encryption/decryption of communications within a pair-verified session, transparently to application 222.

Network configuration 200 can support automated operation of accessories 204. For example, any of controllers 202 or coordinator 210 can execute program code that sends control messages to one or more of accessories 204 upon the occurrence of certain triggering conditions, such as a particular time of day or a particular user action (e.g., user leaving the house). The control messages can instruct the accessory to initiate an action. Thus, for example, a thermostat accessory (e.g., accessory 112 of FIG. 1) can be instructed to heat (or cool) the house to a desired temperature at a particular time based on the user's expected arrival, or to turn off the heat (or cooling) when the user leaves. A user leaving (or entering) local environment 206 can be detected using various techniques. For example, controller 202(1) (or any other controller 202) can be a mobile device that the user habitually wears or carries wherever he or she goes and that automatically connects to a wireless local area network (e.g., a home-based Wi-Fi network) when it is within signal range of the network. When controller 202 disconnects from the network (and remains disconnected for a minimum time), coordinator 210 (or another device that is resident in local environment 206) can detect the disconnection and infer that the user has left local environment 206. Similarly, when controller 202 subsequently reconnects, coordinator 210 can infer that the user has returned to local environment 206. Any other information available to coordinator 210 can be used, including input from presence or proximity sensors that may be installed in local environment 206, location data provided by the user's controller 202(1), inferences from user interactions with particular accessories, and so on.

It will be appreciated that network configuration 200 is illustrative and that variations and modifications are possible. Any number of controllers can establish pairings with an accessory, and each controller can be any type of electronic device that supports user interaction (e.g., through a local or remote user interface) and that can communicate with other devices via wired and/or wireless channels. Examples include mobile phones, tablets, wearable devices, laptop computers, desktop computers, dedicated accessory-control base stations, and so on. The accessory can be any electronic device that has a controllable function and that is capable of communicating with other devices via wired and/or wireless interfaces. Examples include lamps (or lights), fans, thermostats, appliances (refrigerator, oven, dishwasher, clothes washer, clothes dryer, vacuum cleaner, etc.), door locks, door openers, media storage and/or playback devices (TV, cable or satellite television interface unit, DVD player, digital video recorder, digital music player, streaming media device, etc.), utility meters (e.g., water, electric, and/or gas meters that can be read by a controller), irrigation systems (e.g., sprinklers, drip irrigation), and so on.

III. Example Devices

Figure 3:
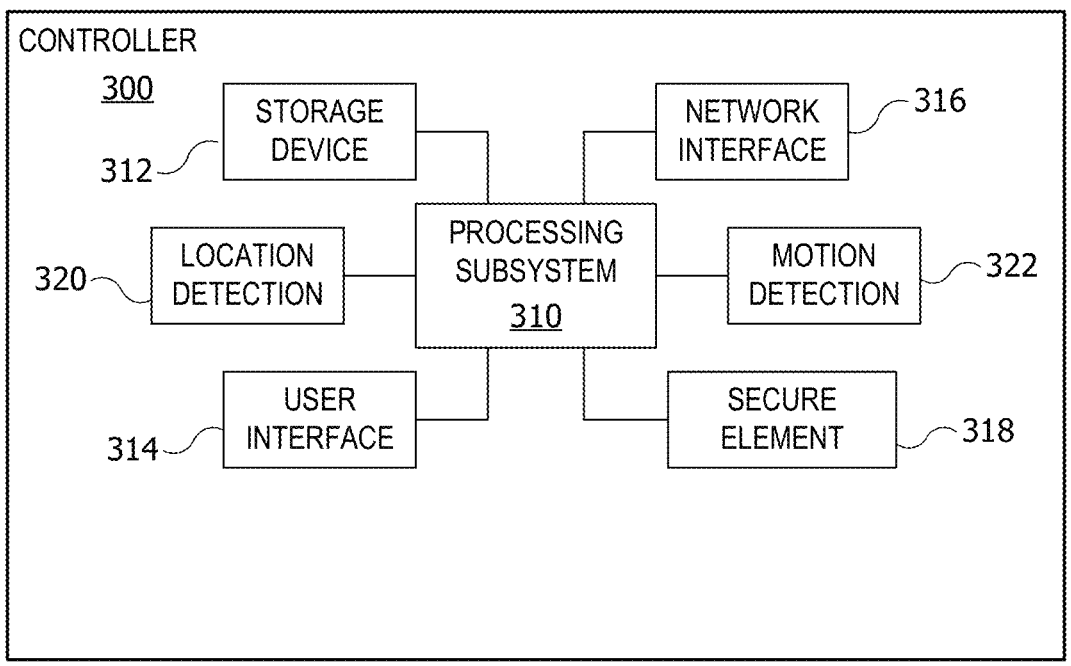
FIG. 3 is a simplified block diagram of a controller according to an embodiment of the present invention.

FIG. 3 is a simplified block diagram of a controller 300 according to an embodiment of the present invention. Controller 300 can implement any or all of the controller functions, behaviors, and capabilities described herein, as well as other functions, behaviors, and capabilities not expressly described. Controller 300 can include processing subsystem 310, storage device 312, user interface 314, network interface 316, secure element 318, location detection element 320, and motion detection element 322. Controller 300 can also include other components (not explicitly shown) such as a battery, power controllers, and other components operable to provide various enhanced capabilities. In various embodiments, controller 300 can be implemented in a desktop computer, laptop computer, tablet computer, smart phone, wearable computing device, or other systems having any desired form factor. Further, as noted above, controller 300 can be implemented partly in a base station and partly in a mobile unit that communicates with the base station and provides a user interface.

Storage device 312 can be implemented, e.g., using disk, flash memory, or any other non-transitory storage medium, or a combination of media, and can include volatile and/or non-volatile media. In some embodiments, storage device 312 can store one or more application and/or operating system programs to be executed by processing subsystem 310, including programs to implement various operations described herein as being performed by a controller. For example, storage device 312 can store a universal controller application that can read an accessory description record and generate a graphical user interface for controlling the accessory based on information therein (e.g., as described in above-referenced U.S. patent application Ser. No. 14/614,914). Storage device 312 can also store a "user routine" program that can determine a user routine and detect deviations from that routine (e.g., as described below). In some embodiments, portions (or all) of the controller functionality described herein can be implemented in operating system programs rather than applications. In some embodiments, storage device 312 can also store apps designed for specific accessories or specific categories of accessories (e.g., an IP camera app to manage an IP camera accessory or a security app to interact with door lock accessories).

User interface 314 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 314 to invoke the functionality of controller 300 and can view and/or hear output from controller 300 via output devices of user interface 314.

Processing subsystem 310 can be implemented as one or more integrated circuits, e.g., one or more single-core or multi-core microprocessors or microcontrollers, examples of which are known in the art. In operation, processing subsystem 310 can control the operation of controller 300. In various embodiments, processing subsystem 310 can execute a variety of programs in response to program code and can maintain multiple concurrently executing programs or processes. At any given time, some or all of the program code to be executed can be resident in processing subsystem 310 and/or in storage media such as storage device 312.

Through suitable programming, processing subsystem 310 can provide various functionality for controller 300. For example, in some embodiments, processing subsystem 310 can implement various processes (or portions thereof) described herein as being implemented by a controller. Processing subsystem 310 can also execute other programs to control other functions of controller 300, including application programs that may be stored in storage device 312. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Network interface 316 can provide voice and/or data communication capability for controller 300. In some embodiments, network interface 316 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments, network interface 316 can provide wired network connectivity (e.g., Ethernet) in addition to or instead of a wireless interface. Network interface 316 can be implemented using a combination of hardware (e.g., driver circuits, antennas, modulators/demodulators, encoders/decoders, and other analog and/or digital signal processing circuits) and software components. In some embodiments, network interface 316 can support multiple communication channels concurrently, using the same transport or different transports.

Secure element 318 can be an integrated circuit or the like that implements or supports cryptographic operations of controller 300, including any or all cryptographic operations related to pair setup, pair add, and pair verify. Secure element 318 can appear as a "black box" to the rest of controller 300. Thus, for instance, network interface 316 can receive a message in encrypted form that it cannot decrypt and can simply deliver the message to processing subsystem 310. Processing subsystem 310 may also be unable to decrypt the message, but it can recognize the message as encrypted and deliver it to secure element 318. Secure element 318 can decrypt the message and determine what information to return to processing subsystem 310. As a result, certain information can be available only within secure element 318. If secure element 318 is a single IC that executes code only from its own secure repository, this can make extraction of the information extremely difficult, which can provide a high degree of security. Examples of secure elements are described further in above-referenced U.S. patent application Ser. Nos. 14/725,891 and 14/725,912.

Location detection element 320 can include hardware and/or software components operable to determine a geographical location of controller 300. For example, location detection element 320 can implement a GPS receiver. Other location-determination technologies can also be used, such as Wi-Fi fingerprinting (distinguishing and recognizing locations based on availability and signal strength of various Wi-Fi networks), cellular tower triangulation (based on detecting proximity to different transceiver "cells" in a cellular voice or data network), and so on.

Motion detection element 322 can include hardware and/or software components operable to detect and measure motion of controller 300. For example, motion detection element 322 can include motion sensors such as accelerometers, gyroscopic motion sensors, or the like. In some embodiments, motion detection element 322 can process signals from the motion sensors and infer a specific activity or motion of the controller or a user (e.g., whether the user is riding in a vehicle, walking, running, etc.). In some embodiments, controller 300 can also incorporate other types of environmental sensors, such as ambient light sensors, ambient sound sensors, physiological sensors, etc.

Figure 4:
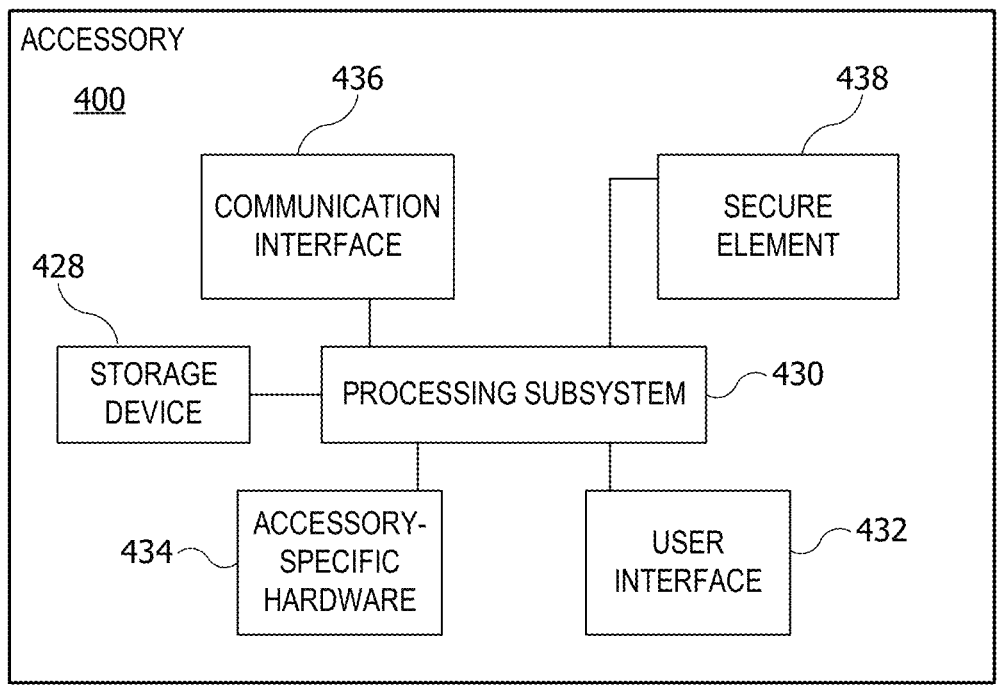
FIG. 4 is a simplified block diagram of an accessory according to an embodiment of the present invention.

FIG. 4 is a simplified block diagram of an accessory 400 according to an embodiment of the present invention. Accessory 400 can implement any or all of the accessory functions, behaviors, and capabilities described herein, as well as other functions, behaviors, and capabilities not expressly described. Accessory 400 can include storage device 428, processing subsystem 430, user interface 432, accessory-specific hardware 434, communication interface 436, and secure element 438. Accessory 400 can also include other components (not explicitly shown) such as a battery, power controllers, and other components operable to provide various enhanced capabilities. Accessory 400 is representative of a broad class of accessories that can be operated by a controller such as controller 300, and such accessories can vary widely in capability, complexity, and form factor. For instance, accessory 400 can implement any of accessories 104-122 of FIG. 1.

Storage device 428 can be implemented, e.g., using disk, flash memory, or any other non-transitory storage medium, or a combination of media, and can include volatile and/or non-volatile media. In some embodiments, storage device 428 can store one or more application programs to be executed by processing subsystem 430, including programs to implement various operations described above as being performed by an accessory, as well as operations related to particular accessory behaviors. Storage device 428 can also store an accessory descriptor record that can be furnished to controller devices, e.g., during device discovery as described in above-referenced U.S. patent application Ser. No. 14/614,914. Storage device 428 can also store accessory state information and any other data that may be used during operation of accessory 400.

Processing subsystem 430 can include, e.g., one or more single-core or multi-core microprocessors and/or microcontrollers executing program code to perform various functions associated with accessory 400. For example, processing subsystem 430 can implement various processes (or portions thereof) described above as being implemented by an accessory, e.g., by executing program code stored in storage device 428. Processing subsystem 430 can also execute other programs to control other functions of accessory 400. In some instances programs executed by processing subsystem 430 can interact with a controller (e.g., controller 300), e.g., by generating messages to be sent to the controller and/or receiving messages from the controller.

User interface 432 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 400, a user can operate input devices of user interface 432 to invoke functionality of accessory 400. Some accessories may provide a minimal or no user interface.

Accessory-specific hardware 434 can include any other components that may be present in accessory 400 to enable its functionality. For example, in various embodiments accessory-specific hardware 434 can include one or more storage devices using fixed or removable storage media; GPS receiver; power supply and/or power management circuitry; a camera; a microphone; one or more actuators; control switches; fans; motors; heating elements; valves; position sensors (e.g., position encoders); environmental sensors (e.g., temperature sensor, pressure sensor, accelerometer, chemical sensor, etc.); and so on. It is to be understood that any type of accessory functionality can be supported by providing appropriate accessory-specific hardware 434 and that accessory-specific hardware can include mechanical as well as electrical or electronic components.

Communication interface 436 can provide voice and/or data communication capability for accessory 400. In some embodiments, communication interface 436 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments, communication interface 436 can provide wired network connectivity (e.g., Ethernet) in addition to or instead of a wireless interface. Communication interface 436 can be implemented using a combination of hardware (e.g., driver circuits, antennas, modulators/demodulators, encoders/decoders, and other analog and/or digital signal processing circuits) and software components. In some embodiments, communication interface 436 can support multiple communication channels concurrently, using the same transport or different transports.

Secure element 438 can be an integrated circuit or the like that implements or supports cryptographic operations of accessory, including any or all cryptographic operations related to pair setup, pair add, or pair verify. Secure element 438 can operate similarly to secure element 318 in controller 300. Examples of secure elements are described further in above-referenced U.S. patent application Ser. Nos. 14/725,891 and 14/725,912.

Accessory 400 can be any electronic apparatus that interacts with controller 300. In some embodiments, controller 300 can provide control over operations of accessory 400 as described above. For example controller 300 can provide a user interface for accessory 400 that can include both input and output controls (e.g., a display screen to display current state information obtained from accessory 400 and an input control such as a touchscreen overlay to allow the user to initiate changes to the state information, resulting in a change in some attribute of the accessory's state). Controller 300 in various embodiments can control any function of accessory 400 and can also receive data from accessory 400. Further, in some instances, accessory 400 can operate as a coordinator for other accessories, e.g., as described above.

It will be appreciated that the system configurations and components described herein are illustrative and that variations and modifications are possible. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. For example, as noted above, coordinator 210 of FIG. 2 can implement both accessory and controller functionality, and the same hardware components can be used for both. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

IV. Example of Determining a User Routine

As noted above, it may be desirable for a controller (or coordinator) to automate operation of an accessory for the convenience of occupants of an environment where the accessory is located. For example, referring to FIG. 1, it may be desirable to operate thermostat 112 to warm (or cool) home environment 100 to a desired temperature in anticipation of the occupant returning. Or it may be desirable to make sure that TV 114 and light fixture 108 are both switched off when the occupant goes to bed.

While desirable, such automated control is complicated by the reality that most human beings do not adhere to a rigid schedule. Further, many environments have multiple occupants; for instance, a home may be occupied by parents and children, by a group of unrelated housemates, or the like. (The term "family" may be used herein to refer collectively to the occupants of a home, regardless of their particular legal or biological relationship or lack thereof.)

Accordingly, home automation and control can be enhanced based on knowledge of a user routine of various occupants. As used herein, a "user routine" (or just "routine") can refer generally to any pattern of behavior of an individual that can be inferred by an automated machine learning algorithm based on inputs indicative of the individual's location and/or activity at various times over an extended time span. In some embodiments, a user routine can be inferred by a mobile device that an individual habitually wears or carries (e.g., a smart phone or smart watch or the like), based on data automatically collected by the device.

Figure 5:
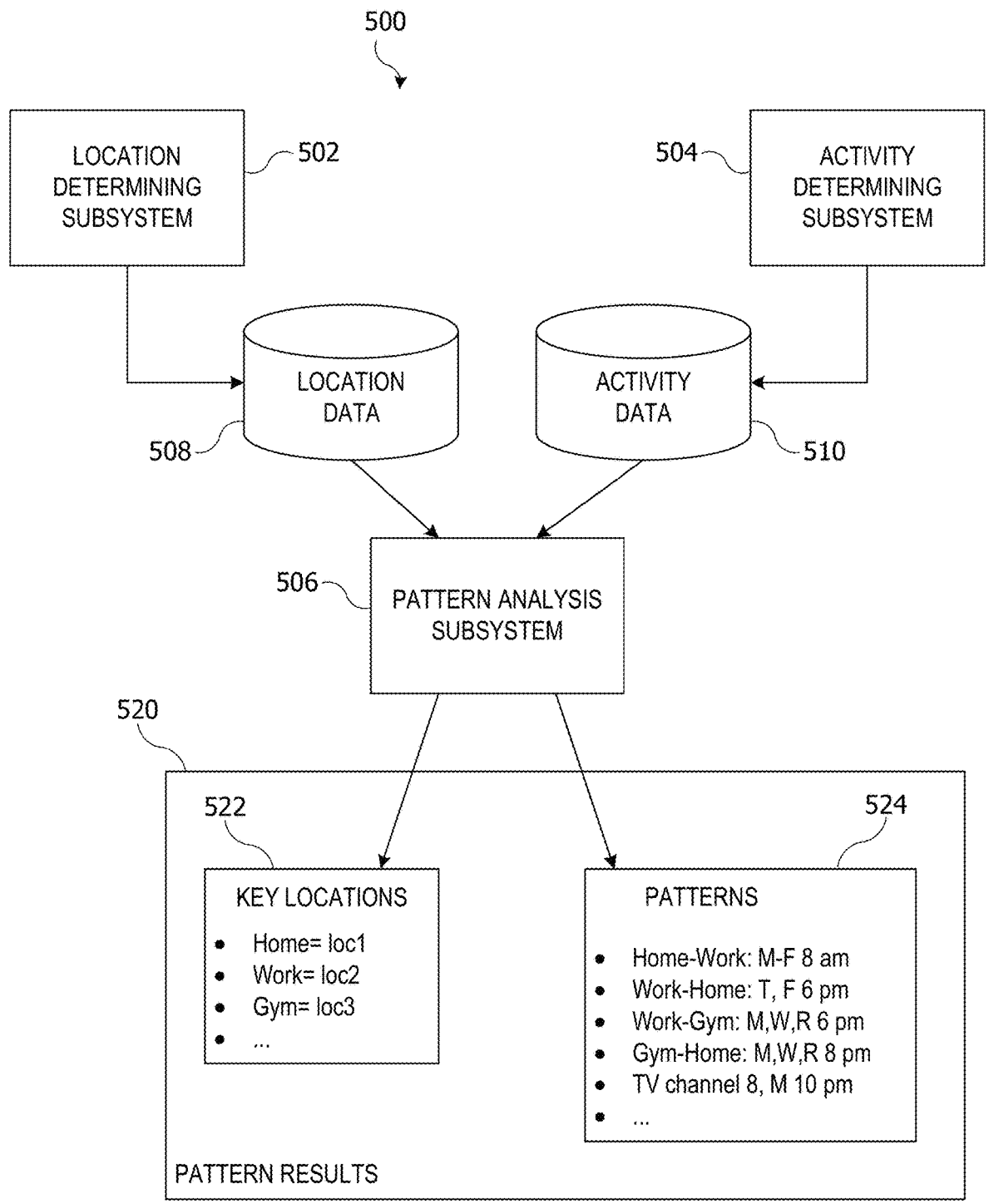
FIG. 5 is a simplified block diagram of a system for determining a user routine that can be used in connection with an embodiment of the present invention.

FIG. 5 is a simplified block diagram of a system 500 for inferring a user routine that can be used in connection with an embodiment of the present invention. System 500 can be implemented in a mobile device such as a smart phone or smart watch, and the same device can also implement a controller as described herein (e.g., controller 300 of FIG. 3, any of controllers 202 of FIG. 2, controller 102 of FIG. 1). System 500 can gather and analyze data pertaining to user location and activity across time and can analyze the data to detect patterns.

System 500 can include a location determining subsystem 502, an activity determining subsystem 504, and a pattern analysis subsystem 506. Location determining subsystem 502 can operate at various times to determine the current location of the device in which system 500 is implemented and can store the location information in location data store 508. For example, location determining subsystem 502 can incorporate a GPS receiver and can activate the GPS receiver from time to time to obtain a location fix (e.g., standard world coordinates representing the location of the device). The location fix, along with a time stamp indicating when the fix was obtained, can be stored in location data store 508. Location determining subsystem 502 can operate on a fixed schedule (e.g., recording location every few minutes) or opportunistically (e.g., recording location data whenever another process in the device requests current location information).

Activity determining subsystem 504 can operate at various times to determine a current activity in which the user is engaged and can store the activity information in activity data store 510. For example, activity determining subsystem 504 can incorporate accelerometers, gyroscopic motion sensors, or other inertial motion sensors that can detect whether and how the device is moving. In some embodiments, activity determining subsystem 504 can determine the user activity based on the motion (e.g., whether the user is running, walking, riding in a vehicle, stationary, or whether the device is at rest on a stable surface such as a tabletop). Like location determining subsystem 502, activity determining subsystem 504 can operate on a regular schedule or opportunistically as desired. In some embodiments, activity determining subsystem 504 can also detect other status information pertaining to the device, such as whether the device is connected to a power source (e.g., a charger) or to a particular auxiliary device (e.g., an automobile head unit, a speaker dock, a specific computer system). This status information can also include information pertaining to user interactions with the device, such as launching a particular app (e.g., workout tracking app, telephony app, media app, remote control app to control accessories as described above) or changing device settings (e.g., enabling or disabling a "do not disturb" function, setting or canceling an alarm, etc.). In some embodiments, the status information can also include elements of the user's personal data that are accessible to the device in which system 500 is implemented, such as calendar data (e.g., scheduled appointments, meetings, and other events) maintained for the user. In general, any information indicative of what a user is doing that can be detected by the device can be included as activity data. Time-stamped activity data can be recorded in activity data store 510.

Through the ongoing operation of location determining subsystem 502 and activity determining subsystem 504, location data store 508 and activity data store 510 can accumulate a collection of location and activity records covering a span of time (e.g., six to eight weeks). The particular time span can be selected as desired, based on considerations such as storage space, the length of a time span needed to detect patterns of activity, and the desire to protect user privacy by not keeping records of user activity indefinitely, while keeping enough data to provide useful pattern results.

Pattern analysis subsystem 506 can periodically (e.g., once a day or once a week or the like) analyze the data accumulated in location data store 508 and activity data store 510 to detect various patterns that may be present. Examples of patterns can include going to particular locations repeatedly, going to a particular location at a similar time each day (e.g., commuting to and from work), using a particular device function while in a particular location (e.g., launching a workout app when at the gym), using a particular device function at a consistent time or in a consistent manner (e.g., setting alarm for 7:00 am, turning off the lights between 10 pm and 11 pm), or the like. Examples of pattern analysis and pattern detection are described in above-referenced U.S. patent application Ser. No. 14/081,895.

Pattern analysis subsystem 506 can output various pattern results 520. For example, pattern results 520 can include a set of "key location" identifiers 522. As used herein, a "key location" can be a location that the user visits regularly and spends significant time at. Examples can include the user's home, the user's place of work, a gym (or other workout space) the user frequents, and so on. In some embodiments, pattern analysis subsystem 506 can generate a list of key locations 522 without semantically labeling them. In other embodiments, pattern analysis subsystem 506 can assign semantic labels to some or all of key locations 522, e.g., based on activity information correlated with the location. For instance, a "home" location can be identified based on activity patterns such as where the device is when it is charged, where the device is left resting on a surface for long periods of time (suggesting that the user is asleep), where the device is when a daily alarm goes off, etc. A "work" location can be identified based on where the user goes most regularly that is not the home location and/or on activity the user does there (e.g., accessing productivity apps). Other locations, such as a gym, store, or the like can also be identified based on activity information (e.g., a "gym" can be any place where a user regularly performs workout activities such as running, cycling, or weightlifting).

Another example of pattern results can be pattern identifiers 524. Pattern identifiers 524 can include transitions between key locations that occur with reasonable regularity, such as the user going from home to work (or vice versa) or from work to the gym (if the user regularly goes to a gym after work). In some embodiments, pattern identifiers 524 can also include patterns of interactions with accessories in a particular location, provided that the device in which system 500 is included can detect the interaction. For instance, upon coming home, the user may operate a remote control app on his or her mobile phone to turn on the TV or select a particular program to watch, and such interactions can be detected and recorded by activity determining subsystem 504.

In some embodiments, pattern results are periodically generated or updated (e.g., on a daily or weekly basis), and previous results can be used to inform the generation of new pattern results. In such cases, it may be useful to retain "old" pattern results for a period of time. This period of time can be limited (e.g., to four months, eight months, etc.), in the interest of protecting user privacy.

It will be appreciated that system 500 is illustrative and that variations and modifications are possible. Determination of a user routine can be implemented in any manner desired, and further examples can be found in above-referenced U.S. patent application Ser. No. 14/081,895. In the interest of protecting user privacy, it may be desirable for system 500 to be implemented entirely within a single device (e.g., the user's mobile phone), such that the location data, activity data, and/or pattern results are not shared with other devices. In addition, it may be desirable to discard location data, activity data, and/or pattern results after a period of time (e.g., several weeks). In some embodiments, some or all of pattern results 520 (including key location identifiers 522 and/or pattern identifiers 524) can be selectively made available to trusted applications on the device in which system 500 is implemented and/or to other trusted devices, e.g., as described below; the raw location data and/or activity data from which pattern results were derived need not be shared.

V. Modifying Automated Behavior Based on User Routine

Figure 6:
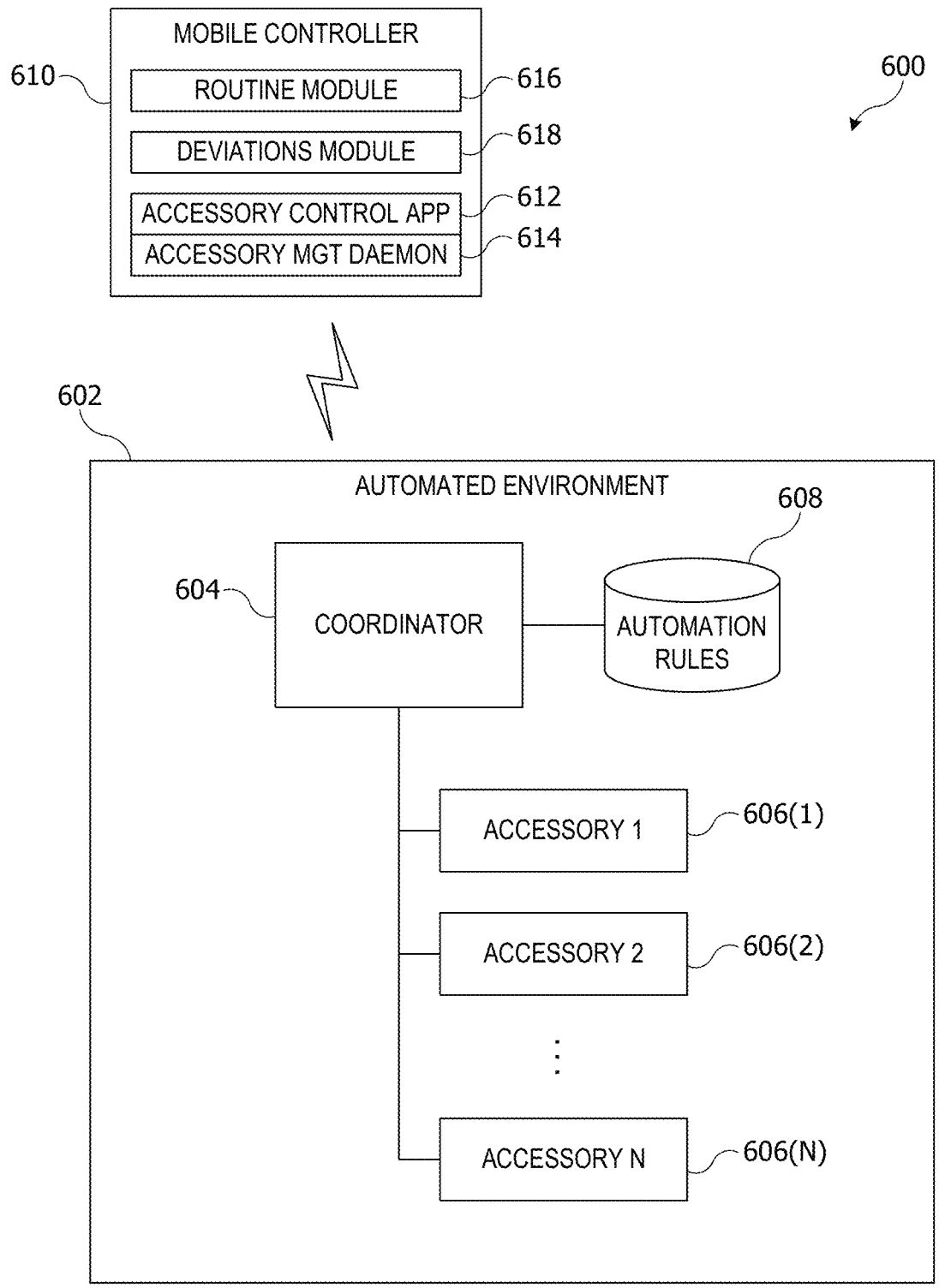
FIG. 6 is a simplified block diagram of a system according to an embodiment of the present invention.

In some embodiments of the present invention, an operational behavior of an accessory can be automatically modified based on a detected deviation from an established user routine. FIG. 6 is a simplified block diagram of a system 600 according to an embodiment of the present invention. System 600 can include an automated environment 602. Automated environment 602 can include a coordinator 604, which can be similar to coordinator 210 of FIG. 2, and various accessories 606(1)-606(N) with which coordinator 604 can communicate. (N can be any integer.) As described above, accessories 606 can include various objects or things in an environment that can be electronically controlled, such as any of accessories 104-122 of FIG. 1. Accessories 606 can operate similarly to accessories 204 of FIG. 2.

In this example, coordinator 604 can maintain a store of automation rules 608. As used herein, an automation rule can specify an action to be taken by one or more of accessories 606 and a triggering condition under which the action is to be taken. The action can be any action that can be performed by a specific accessory 606, and the rule can specify which accessory (or accessories) 606 is to act. The triggering condition can be any condition that is detectable by coordinator 604 or by any of accessories 606. For example, an automation rule can specify that a porch light (an accessory) is to be turned on if an outside ambient light sensor (which can be a separate accessory or a component of the porch light accessory) detects a light level below a threshold, or at a specific time each night (e.g., 6:30 pm), or at a time determined based on information available to coordinator 604 (e.g., sunset, where coordinator 604 can determine the time of sunset by accessing weather data via the Internet or the like). As another example, an action can include turning on a heating (or cooling) system to adjust the temperature of the house to a target temperature, or changing the target temperature for the heating (or cooling) system. The triggering condition for a temperature change can be, for example, a specific time (e.g., shortly before the time the user normally arrives at home) or a specific event (e.g., when the user actually arrives home).

Automation rules 608 can be established in any manner desired. For example, a user can establish an automation rule by direct input (e.g., entering explicit instructions specifying a triggering condition and the action to be taken in response to that condition). In some embodiments, coordinator 604 or other components of system 600 can learn the user's behavior and define suggested automation rules. Coordinator 604 or other components of system 600 can present the suggested automation rules to the user, and the user can accept or decline the suggestions. Other techniques for establishing automation rules 608 can also be used.

While in the example shown, coordinator 604 maintains all automation rules 608, other implementations are possible. For instance, an accessory 606 can maintain its own automation rule(s), provided that the accessory is capable of detecting the triggering condition and initiating the corresponding action.

A mobile controller device 610 can communicate with automated environment 602. Mobile controller device 610 can be, for example, a mobile phone, wearable device, or other electronic device that a user may habitually wear or carry while going about daily activities. Similarly to controllers 202 described above, mobile controller device 610 can implement an accessory control app 612 and an accessory management daemon 614. These processes can allow mobile controller device 610 to communicate with components of automated environment 602 regardless of whether mobile controller device 610 is in physical proximity to the various devices of automated environment 602.

Mobile controller device 610 can include a routine module 616 (e.g., implementing system 500 described above) that can determine an established user routine (including, e.g., pattern results 520). Mobile controller device 610 can also include a deviations module 618, which can analyze real-time data provided by location determining subsystem 502 and/or activity determining subsystem 504 and can compare the real-time location and/or activity data to pattern results 520 to determine whether the user's current location and/or activity is consistent or inconsistent with the established user routine. As used herein, a "deviation" can refer to any instance where the user's current location and/or activity is inconsistent with an established user routine. For instance, the established user routine can be used to predict a current location and/or activity, and this prediction can be compared with the real-time data. Examples of specific logic and processes for detecting deviations from an established user routine are described in above-referenced U.S. patent application Ser. No. 14/081,895.

In operation, mobile controller device 610 can use routine module 616 to determine an established user routine and deviations module 618 to detect deviations from the routine. In accordance with an embodiment of the present invention, a detected deviation can result in mobile controller device 610 notifying automated environment 602, and the automated behavior of one or more accessories 606 can be modified (e.g., by overriding the normal operation of the automation rule) based on the deviation.

It is not necessary that every deviation results in a modification in the operational behavior of automated environment 602. For example, if the user is stuck in traffic on the way home and running a few minutes late, it may be desirable to continue the normal automated behavior. However, if the user is on the way to a dinner engagement that will delay the user's arrival at automated environment 602 by several hours, a modification in behavior may be preferred.

In some embodiments, mobile controller device 610 can include logic modules to determine which deviations from the established user routine should affect the operational behavior of automated environment 602. For example, mobile controller device 610 can implement logic rules to determine whether operational behavior of automated environment 602 should be affected. In other embodiments, such logic can be implemented in coordinator 604 or other devices in automated environment 602. As one specific example, a logic rule can specify that any delay in the user's in arrival time of less than 30 minutes or 1 hour can be ignored, but a longer delay should affect the behavior. As another example, user input can be requested to determine whether behavior should be modified.

Figure 7:
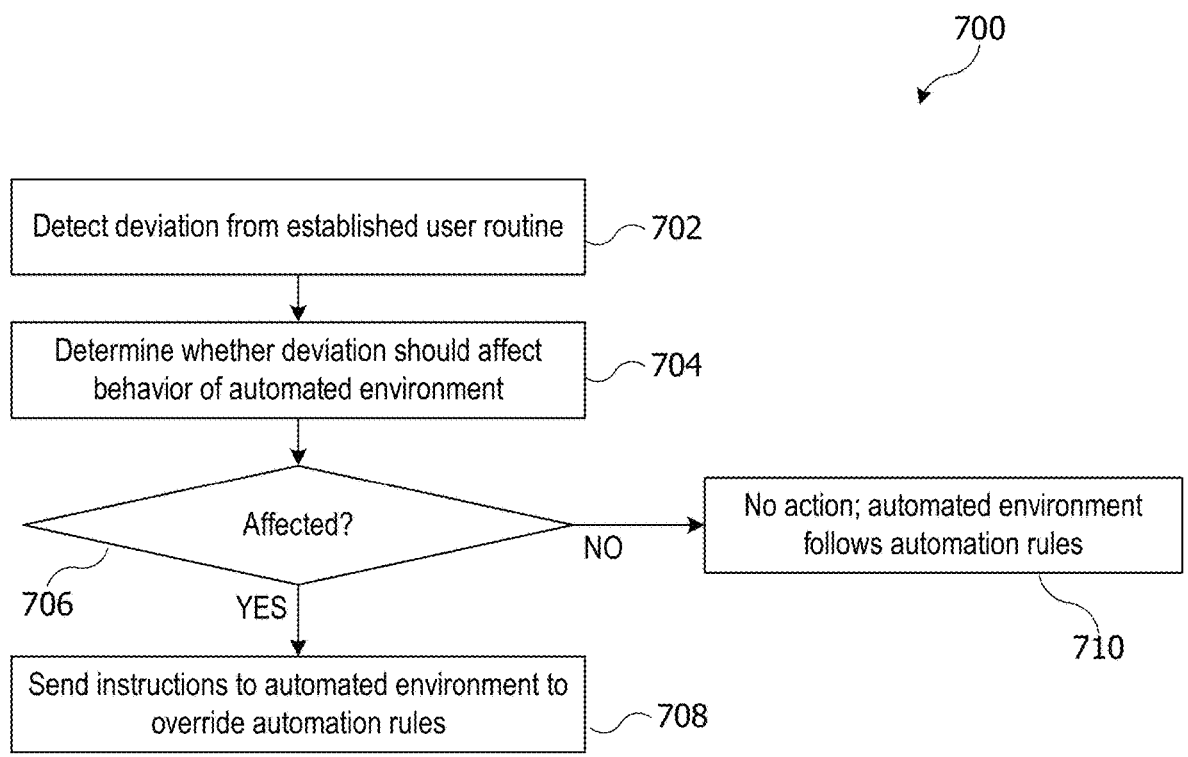
FIG. 7 is a flow diagram of a process for modifying automated behavior of an accessory according to an embodiment of the present invention.

FIG. 7 is a flow diagram of a process 700 for modifying automated behavior of an accessory according to an embodiment of the present invention. Process 700 can be implemented, e.g., in mobile controller device 610 of FIG. 6 (e.g., within deviations module 618).

At block 702, process 700 can detect a deviation from an established user routine. In some embodiments, the established user routine can be defined by operation of routine module 616 (e.g., system 500 described above), which can analyze the user's location and/or activity data across time to detect various patterns, such as daily or weekly habits. Such patterns can constitute an established user routine. A deviation from an established user routine can be detected by comparing the user's current location and/or activity with predictions derived from the patterns. In some embodiments, detecting a deviation can include determining whether the deviation satisfies a criterion of significance. For example, some patterns may be only weakly established (e.g., the amount of time the user spends at the gym may vary considerably from day to day or week to week) while some patterns may be strongly established (e.g., the user always leaves home between 8:00 am and 8:30 am on weekdays). The criterion of significance can be defined such that for weaker patterns, a larger deviation is required than for stronger patterns.

At block 704, process 700 can determine whether the deviation should affect an operational behavior of the automated environment. For example, if the deviation does not satisfy the criterion of significance, then the deviation can be ignored. As another example, some of the user's patterns might not correlate to the triggering conditions for any actions in automated environment 602. For instance, the user may have an established routine that includes leaving the office at a certain time to go to the gym, but a deviation in when the user leaves the office to go to the gym would not be expected to affect the user's home environment, and the deviation can be ignored by process 700.

In some embodiments, mobile controller device 610 can access automation rules 608 (or at least the triggering conditions) and can determine whether a triggering condition correlates with the particular pattern that is being deviated from. For example, a triggering condition for turning on the heat may correlate with the user's routine arrival times at home, and it is likely that the user would want turning on the heat to be affected by deviations in the user's arrival time (such as if the user is working late at the office or going out to dinner instead of going home). In contrast, a user would not want or expect a triggering condition for turning off the heat that correlates with the user leaving the house to be affected by deviations in the user's time of arrival at home.

Process 700 can determine that the automated behavior of one or more accessories are to be modified based on the deviation from the established user routine and any correlated automation rules for the accessories. For example, the deviation can correlate to one automation rule that involves multiple accessories. As another example, the deviation can correlate to multiple automation rules that each involve one or more accessories.

In some embodiments, block 704 can include determining a proposed behavior modification and prompting the user to indicate whether the proposed modification should be accepted. For example, mobile controller device 610 can generate a visual or audible prompt identifying the detected deviation from the established routine (e.g., "Looks like you are working late") and a proposed modification in the operational behavior of the automated environment (e.g., "Would you like to delay heating the house?"). The user can respond to accept or decline the proposed modification (e.g., by saying "Yes" or "No," by tapping or otherwise operating a control element, etc.).

At decision block 706, if the deviation should affect the operational behavior, then, at block 708, process 700 can send appropriate instructions to automated environment 602 to override one or more automation rules 608. The instructions can be sent to coordinator 604 or directly to accessories 606, depending on implementation. The instructions in this case do not change automation rules 608; instead, the instructions can operate to temporarily override one or more automation rules 608. For example, an instruction can indicate that a particular automation rule should be ignored, that an action different from the action specified by the rule should be taken, or that an alternative triggering condition different form the triggering condition specified by the rule should be temporarily substituted. In some embodiments, instructions can be sent for all three commands, e.g., to ensure that the particular automation rule is not enacted, and that other action of triggering condition is performed. The override can act as a temporary exception that remains in effect until the deviation from the established user routine ends.

If, at block 706, the deviation should not affect the operational behavior, then at block 710, no action is taken, and automated environment 602 can operate according to automation rules 608.

In process 700, mobile controller device 610 implements logic to determine whether a detected deviation from the established user routine should affect an operational behavior of automated environment 602. In another implementation, mobile controller device 610 can notify coordinator 604 (and/or other devices in automated environment 602) of a detected deviation, and coordinator 604 can implement logic to determine what, if any, modification should result.

Figure 8:
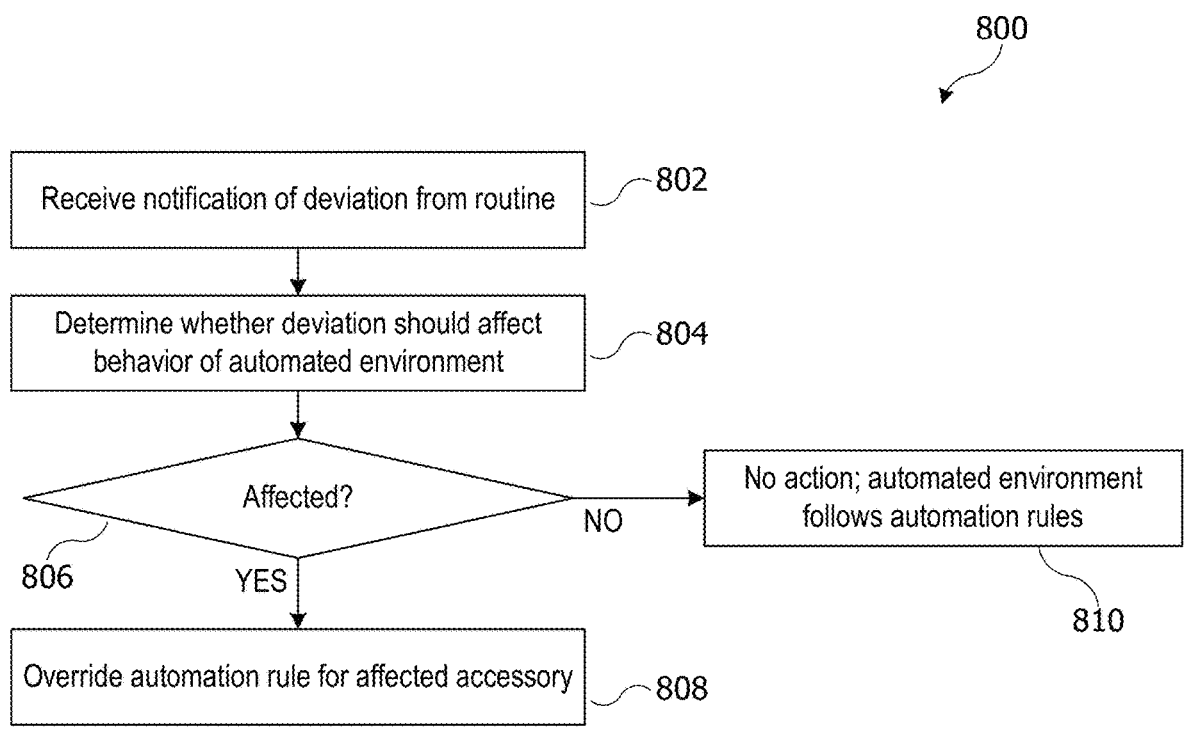
FIG. 8 is a flow diagram of a process for modifying automated behavior of an accessory according to an embodiment of the present invention.

FIG. 8 is a flow diagram of a process 800 for modifying automated behavior of an accessory according to an embodiment of the present invention. Process 800 can be implemented, e.g., in coordinator 604 of FIG. 6.

At block 802, process 800 can receive a notification (e.g., from mobile controller device 610) that a user is deviating from an established user routine. The notification can include specific information about the deviation (e.g., that the user is delayed by traffic, or that the user is going out to dinner). In some embodiments, mobile controller device 610 can apply a criterion of significance as described above, so that the notification is only received for deviations that are considered significant. It should be noted that the notification need not include specific information about the user's established routine or the user's current location or activity. The notification can be communicated via a secure communication channel (e.g., using the pair setup and pair verify processes described above).

At block 804, process 800 can determine whether the deviation should affect an operational behavior of the automated environment. The determination can be generally similar to block 704 of process 700 described above. If user confirmation of a suggested modification is desired, block 804 can include sending an instruction to mobile controller device 610 to prompt the user for confirmation and receiving a response to the prompt from mobile controller device 610.

At decision block 806, if the deviation should affect the operational behavior, then, at block 808, process 800 can override the automation rule for the affected accessory. For example, in some embodiments, coordinator 604 can execute automation rules 608 by determining whether the triggering condition for a rule is satisfied and, if so, sending a message to the accessory instructing the accessory to take the corresponding action. Where this is the case overriding the automation rule can include not sending an instruction message to the accessory even though the triggering condition is satisfied, sending an instruction message to the accessory that differs from the message indicated by the automation rule, or sending the instruction message indicated by the automation rule at a different time or under a different condition. If the accessory determines whether its own triggering condition is satisfied, then coordinator 604 can send an override instruction to the accessory; the override instruction can tell the accessory to ignore the triggering condition, to substitute a different triggering condition, or to take a different action in response to the triggering condition. As noted above, overriding an automation rule need not change the rule itself; instead, the override can operate as a temporary exception that remains in effect until the deviation from the established user routine ends. If, at block 806, the deviation should not affect the operational behavior, then at block 810, no action is taken, and automated environment 602 can operate according to automation rules 608.

It will be appreciated that the systems and processes described herein are illustrative and that variations and modifications are possible. Process steps described as sequential may be executed in parallel, order of steps may be varied, and steps may be modified, combined, added or omitted. Automation rules can be stored on accessories, in a coordinator, and/or in a mobile controller device as desired. Various criteria can be used to determine whether an automated behavior should be modified when a user deviates from an established routine. For example, suggested or actual modifications can be selected based in part on a particular goal, such as conserving energy (e.g., by not operating heating or cooling systems when the user is not present) or increasing user comfort (e.g., opportunistically running sprinkler systems or loud appliances when the user is not present). A deviation from the established user routine can result in modifying behavior of one or more accessories. It is to be understood that the modification of accessory behavior can be a temporary response to a deviation from an established user routine, and when the user returns to the established routine, the behavior can return to following the (unmodified) automation rule.

To further illustrate modifying an automated behavior, specific use-case examples will now be described. Any or all of these use-cases can be implemented in combination, and these examples are not intended to be exhaustive.

VI. Use Cases

A. Use-Case 1: Delaying Actions Based on Delayed User Arrival

Users may wish an automated environment to take various actions in anticipation of the user's arrival. For example, the user may wish to have certain lights turned on, to have the home heated or cooled to a comfortable temperature, to have particular music playing, or the like.

Where the user has an established routine, various actions can be connected to the routine. For instance, a user's established routine may include going to the gym after work three days a week and coming directly home from work the other two days. The home can be automated to prepare for the user's arrival by establishing rules to take the user's desired "homecoming" actions based on a daily arrival time that reflects the user's routine. These desired homecoming actions can include turning on lights, heating or cooling the home, playing music, or the like.

The user can deviate from the established routine by not coming home at the usual time. For example, the user may have a dinner engagement or take time to do errands on the way home. The user's mobile device, which has determined the established routine, can detect such deviations and notify the home, e.g., by communicating with a coordinator via a wide-area network as described above. The home can act accordingly by delaying the homecoming actions. In some embodiments, the mobile device can predict a likely arrival time (e.g., based on a scheduled duration of a calendar appointment or based on previous instances of a user running errands at the same locations), and the modified behavior can include taking the homecoming actions based on the predicted arrival time. Accordingly, when the deviation includes returning to the automated environment at a delayed time relative to the established user routine, the operational behavior of the accessory can be modified by delaying operation of the accessory.

B. Use-Case 2: Taking Actions Based on Early User Arrival

As in use-case 1, a home environment can have a set of automated homecoming actions that are to be taken based on daily arrival times that reflect a user's routine. In this use-case, however, the user can deviate from the routine by coming home earlier than expected. For example, the user may have an early dismissal from work or may be taking a day off. The user's mobile device, which has determined the established routine, can detect such a deviation and notify the home, e.g., by communicating with a coordinator via a wide-area network as described above. The home can modify its behavior accordingly by taking the homecoming actions early. In some embodiments, the mobile device can predict a likely arrival time (e.g., based on calendar data and/or the user's current location and/or path of travel), and the modified behavior can include taking the homecoming actions based on the predicted arrival time.

C. Use-Case 3: Taking Actions Based on Early User Departure

Similarly to arrivals, users may wish an automated environment to take various actions in anticipation of or in response to the user's departure. For example, upon leaving the home, the user may wish to have lights turned off, to suspend heating or cooling (or to change the target temperature to conserve energy), to power down power-consuming devices such as a TV or media system, to start operation of a loud appliance (e.g., dishwasher or clothes washer), or the like.

Where the user has an established routine, various actions can be connected to the routine. For instance, a user's established routine may include going running before work three days a week and coming home after the run to shower and change for work. The home can be automated to perform "departure" actions, such as any of the above actions, based on a daily departure time that reflects the user's routine. Thus, the daily departure time can be defined to ignore the user departing to go running as the user is expected to return within a relatively short period of time.

If the user deviates from the routine, e.g., by skipping the run and going straight to work, the user's mobile device can detect this deviation and notify the home, e.g., by communicating with a coordinator via a wide-area network as described above. The home can act accordingly by taking the departure actions earlier than normal. Thus, when the deviation includes returning to the automated environment at an earlier time than the established user routine, the operational behavior of the accessory can be modified by rescheduling operation of the accessory based on the earlier time.

D. Use-Case 4: Taking Actions Based on Delayed User Departure

As in use-case 3, a home environment can have a set of automated departure actions that are to be taken based on daily departure times that reflect a user's routine. In this use-case, however, the user can deviate from the routine by not departing at the usual time. For example, the user may be expecting a visitor or delivery at home and therefore is staying at home instead of going to work. The user's mobile device, which has determined the established routine, can detect such deviations and notify the home, e.g., by communicating with a coordinator as described above. The home can act accordingly by not taking the departure actions or by waiting to take the departure actions until after the user has actually departed. Accordingly, modifying the operational behavior of the accessory includes continuing a current operation of the accessory when the normal operation would be to turn the accessory off, e.g., in such instances when the deviation includes leaving the automated environment at a later time than the established routine.

E. Use-Case 5: User on Vacation

In some instances, deviations from an established routine may be due to a user traveling (e.g., for work or for vacation). This can result in an extended period of deviation from the established routine (e.g., several days to several weeks). Some embodiments allow deviations due to travel to be detected. For instance, a mobile device with access to the user's calendar data may be able to interpret calendar data entries to detect a scheduled trip (based on keywords or location information included in a calendar-event entry, duration of a scheduled event, or the like). As another example, if the mobile device determines that the user is boarding an airplane or has traveled significantly farther than normal from a home location, this can be an indicator that the user is traveling.

A user who is traveling may wish to suspend various automated home operations, such as daily heating or cooling of the house. In some embodiments, detection of travel can be treated as a deviation from the routine, and the user can be prompted as to whether to suspend various automated home actions for the duration of the travel.

In some embodiments, when the user is traveling, the automated home can emulate some or all aspects of the user's established routine, to make it appear as if the home is occupied. For example, the automated home can turn lights on and off based on the established routine. The timing can be varied (e.g., based on a range of times when a user routinely turns on or off a particular light) so that it is not apparent to observers that the behavior is automatic.

F. Other Examples of Actions and Modifications

As described above, any action that an accessory can perform can be automatically triggered based on a triggering condition defined in an automation rule, and deviations from the user's routine can be used to override the automation rule.

One example relates to heating and cooling. To save energy, many people prefer to turn off heating and cooling systems when their home is unoccupied, or to change the target temperature from a comfortable temperature to something closer to the outside air temperature. Some existing thermostats allow a user to program scheduled times for changing the target temperature but cannot detect or respond to deviations from the user's routine. In some embodiments of the present invention, the user's established routine can be correlated with the thermostat schedule, and deviations from the routine can result in overriding the scheduled behavior of a thermostat.

Another example relates to lighting. To save energy, many people prefer to turn off lights when their home is unoccupied. But many people also dislike entering a dark home. Some existing lighting systems allow a user to program scheduled times to turn lights on and off but cannot detect or respond to deviations from the user's schedule routine. In some embodiments of the present invention, the user's established routine can be correlated with the lighting schedule, and deviations from the routine can result in overriding the scheduled behavior of a lighting system.

Another example relates to operating appliances. For instance, removing clothing from a clothes dryer while it is still warm can reduce or eliminate the need for ironing. A clothes dryer can be automated to run at a set time (e.g., shortly before the user would normally return home according to an established routine), and the set time can be overridden based on detected deviations from the established routine so that the clothes will likely still be warm when the user returns.

Another example relates to operating loud appliances, such as some dishwashers. For example, some users may prefer to have the dishwasher run while they are away from home, so that the noise is not distracting. In some embodiments, a the user's established routine can be used to identify times when the user is expected to be away from home, and the dishwasher can be scheduled to run at one of those times. If the user deviates from the established routine, e.g., by coming home earlier than usual or by not leaving at the usual time, operation of the dishwasher can be automatically suspended or delayed. Similarly, users may desire to operate sprinkler systems during the night (while they are asleep) or at times when they are not at home. Deviations from the user's established routine (e.g., staying out later than usual) can result in delaying operation of the sprinkler system to a more convenient time.

In some embodiments, when an automated operation is delayed due to a deviation from an established user routine, the operation can be rescheduled. Rescheduling can take into account predictions by the mobile device regarding when the user is likely to return home, as well as other operations that may be scheduled. Other factors can also be considered. For instance, it may be desirable to run energy-intensive appliances such as dishwashers or clothes dryers at off-peak hours, and the rescheduling can include identifying an off-peak time when the user is likely to be home (or away, depending on the user's preference for a particular operation).

Still other examples will be apparent to those skilled in the art with access to the present disclosure.

VII. Further Embodiments

While the invention has been described with respect to specific embodiments, one skilled in the art will recognize that numerous modifications are possible. Controller networks and/or accessory networks can include as many or as few devices as desired. Use of a coordinator is not required; regardless of the number of accessories or number of controllers, it is always possible (at least in principle) to establish pairings between each controller and each accessory and to have all controllers operate by controlling accessories directly.

Further, where a coordinator is present, it can be but need not be the case that all controllers are permitted to access all accessories via the coordinator. For instance, some controllers might be restricted from accessing accessories when not within the local environment, and some accessories might require that controllers access them directly rather than through a coordinator.

In addition, while the foregoing description makes reference to a home as an example of an environment that can be automated, embodiments of the invention are not limited to the home environment. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc.

Similarly, some embodiments are described in connection with a single user or a single mobile controller device. It is to be understood that a home (or other automated environment) can have multiple occupants using multiple controller devices, and the techniques described herein can be applied with respect to any or all of the occupants (users) and controllers that may be associated with a given automated environment. In some examples described above, mobile controllers can provide user-specific data (e.g., pattern results) to a coordinator in the automated environment. In some embodiments, users can opt out of sharing data with the coordinator or select the amount of data to be shared. In the interest of protecting privacy, the coordinator can retain user-specific data locally (e.g., data need not be backed up to the cloud) and store the data securely (e.g., using encryption or the like). In addition, retention of received data can be limited such that only recent user-specific data or environment-level pattern data is stored. For example, the coordinator can be configured to store only the most recent user-specific data from a particular device and to discard environment-level pattern or routine data for a fixed length of time (e.g., four months, eight months, etc.).

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    determining, by a computing device, a geographical location of a user;
    determining, by the computing device, an established user routine based on the determined geographical location of the user, wherein determining the established user routine comprises collecting geographical locations of the user at a plurality of different times;
    detecting, by the computing device, a deviation from the established user routine;
    determining, by the computing device, that the deviation will result in modifying an operational behavior of one or more accessory devices in an automated environment, wherein the one or more accessory devices in the automated environment comprise a plurality of different types of accessory devices that are configured to perform a plurality of different functions, wherein the one or more accessory devices are operated in accordance with an automation rule that specifies a triggering condition and an action to be taken in response to the triggering condition, and wherein the operational behavior is to be modified by temporarily overriding the automation rule; and
    sending, by the computing device, instructions to the automated environment to modify the operational behavior of the accessory device.

2. The method according to claim 1, further comprising sending, by the computing device, content to display on an interface of the accessory device.

3. The method according to claim 2, wherein the content to display comprises content indicating overriding of the automation rule.

4. The method according to claim 1, wherein the computing device maintains one or more automation rules.

5. The method according to claim 1, wherein the computing device determines to temporarily override the automation rule based on data received via the Internet.

6. The method of claim 1, wherein determining that the deviation will result in modifying the operational behavior of the accessory device includes:
    determining that a particular pattern of the established user routine that is being deviated from correlates with the triggering condition of the automation rule.

7. The method of claim 1, wherein determining that the deviation will result in modifying the operational behavior of the accessory device includes:
    determining a proposed modification to the operational behavior of the accessory device;
    presenting a prompt to the user of the computing device suggesting the proposed modification; and
    receiving a user input indicating that the proposed modification is accepted.

8. The method of claim 1, wherein the deviation includes returning to the automated environment at a delayed time relative to the established user routine, and wherein modifying the operational behavior of the accessory device includes delaying operation of the accessory device.

9. The method of claim 1, wherein the deviation includes returning to the automated environment at an earlier time than the established user routine, and wherein modifying the operational behavior of the accessory device includes rescheduling operation of the accessory device based on the earlier time.

10. The method of claim 1, wherein the deviation includes leaving the automated environment at an earlier time than the established user routine, and wherein modifying the operational behavior of the accessory device includes rescheduling operation of the accessory device based on the earlier time.

11. The method according to claim 1, wherein the computing device is configured to determine the geographical location of the user while the user is inside and outside of the automated environment.

12. The method according to claim 1, further comprising receiving from a device, which receives an input from the user, the geographical location of the user that is collected to determine the established user routine.

13. A computing device comprising:
    one or more processors; and
    a computer-readable medium coupled to the one or more processors and storing instructions that, when executed by the one or more processors, cause the one or more processors to:
        determining, by the computing device, a geographical location of a user;
        determining, by the computing device, an established user routine based on the determined geographical location of the user, wherein determining the established user routine comprises collecting geographical locations of the user at a plurality of different times;
        detecting, by the computing device, a deviation from the established user routine;
        determining, by the computing device, that the deviation will result in modifying an operational behavior of one or more accessory devices in an automated environment, wherein the one or more accessory devices in the automated environment comprise a plurality of different types of accessory devices that are configured to perform a plurality of different functions, wherein the one or more accessory devices are operated in accordance with an automation rule that specifies a triggering condition and an action to be taken in response to the triggering condition, and wherein the operational behavior is to be modified by temporarily overriding the automation rule; and
        sending, by the computing device, instructions to the automated environment to modify the operational behavior of the accessory device.

14. The device according to claim 13, further comprising sending, by the computing device, content to display on an interface of the accessory device.

15. The device according to claim 14, wherein the content to display comprises content indicating overriding of the automation rule.

16. The device according to claim 13, wherein the computing device maintains one or more automation rules.

17. The device according to claim 13, wherein the computing device determines to temporarily override the automation rule based on data received via the Internet.

18. A non-transitory computer-readable storage medium having stored therein instructions that, when executed by one or more processors, cause the one or more processors to perform a method comprising:
- determining, by a computing device, a geographical location of a user;
- determining, by the computing device, an established user routine based on the determined geographical location of the user, wherein determining the established user routine comprises collecting geographical locations of the user at a plurality of different times;
- detecting, by the computing device, a deviation from the established user routine;
- determining, by the computing device, that the deviation will result in modifying an operational behavior of one or more accessory devices in an automated environment, wherein the one or more accessory devices in the automated environment comprise a plurality of different types of accessory devices that are configured to perform a plurality of different functions, wherein the one or more accessory devices are operated in accordance with an automation rule that specifies a triggering condition and an action to be taken in response to the triggering condition, and wherein the operational behavior is to be modified by temporarily overriding the automation rule; and
- sending, by the computing device, instructions to the automated environment to modify the operational behavior of the accessory device.

19. The computer-readable storage medium according to claim 18, further comprising sending, by the computing device, content to display on an interface of the accessory device.

20. The computer-readable storage medium according to claim 19, wherein the content to display comprises content indicating overriding of the automation rule.

21. The computer-readable storage medium according to claim 18, wherein the computing device maintains one or more automation rules.

22. The computer-readable storage medium according to claim 18, wherein the computing device determines to temporarily override the automation rule based on data received via the Internet.

* * * * *